Figure 1:
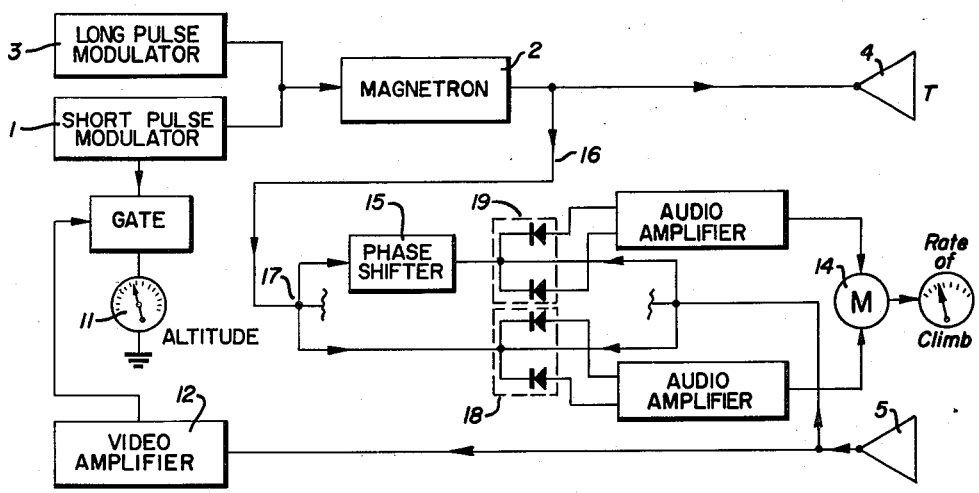

March 6, 1962 S. F. VARIAN ET AL 3,024,456
COMPOSITE INSTRUMENT
Filed June 1, 1956 4 Sheets-Sheet 1

*INVENTOR.*
*Sigurd F. Varian &*
*Henry P. Kalmus*
BY
*Attorney*

INVENTOR.
Sigurd F. Varian &
Henry P. Kalmus
BY
Attorney

March 6, 1962  S. F. VARIAN ET AL  3,024,456
COMPOSITE INSTRUMENT

Filed June 1, 1956  4 Sheets-Sheet 4

DOPPLER WAVES

LIMITED WAVES

DIFFERENTIATED (NEG. PULSES ELIMINATED)

ASCENDING

INVENTOR.
Sigurd F. Varian &
Henry P. Kalmus
BY
Paul B. Hunter
Attorney

United States Patent Office 3,024,456
Patented Mar. 6, 1962

3,024,456
COMPOSITE INSTRUMENT
Sigurd F. Varian, Menlo Park, Calif., and Henry P. Kalmus, Washington, D.C.; said Varian assignor to Varian Associates, San Carlos, Calif., a corporation of California
Filed June 1, 1956, Ser. No. 588,646
12 Claims. (Cl. 343—8)

This invention relates generally to instruments and has reference more particularly to a novel composite instrument capable of indicating plural aspect information such as giving the altitude of an aircraft with respect to the earth or other objects and the first derivative or velocity of the craft position with respect to the earth or other objects such as the rate of climb or descent of the craft or the rate at which the craft is approaching or receding from another craft or object.

Various electronic devices have been employed in the past for indicating the altitude of aircraft with respect to the earth, such as radio altimeters, but these devices as heretofore constructed are subject to serious drawbacks because not only are they usually of very complicated nature resulting in considerable weight of the equipment but their accuracy at low altitudes is exceedingly poor which is a serious handicap during landing operations where knowledge of the correct elevation of the craft with respect to the ground is of extreme importance. Also, heretofore it has been common to use rate of climb indicators based on barometric principles but, owing to variations in barometric pressure and to the considerable time lag involved in the communication of pressure differences on the outside of the craft's hull to the instrument within the craft, these instruments are not reliable in use, and especially when approaching a landing where an accurate rate of descent indication is important.

Electronic altimeters as heretofore used are generally based on frequency modulation techniques. Devices of this kind have two distinct disadvantages. Firstly, there are a number of critical adjustments so that frequent servicing becomes necessary and, secondly, at low altitudes operation is poor which is a serious drawback because during landing operations the low distance behavior of the craft becomes very important.

Heretofore, radar equipment employed for the detection of intercepting aircraft or other objects have been extremely complicated, bulky and expensive and have not generally satisfactorily indicated to the user whether the intercepting aircraft are approaching or receding, nor given accurate indications of the rate of approach or recession. The doppler phenomenon has been used extensively for detecting moving targets or objects and for determining the radial component of the relative velocity between transmitter and object. Oftentimes it is desirable to determine not only this velocity but to know whether the target or object is coming or going. This information is not furnished by the ordinary doppler rate device because they cannot distinguish between positive and negative doppler frequencies.

Theoretically the direction of motion can be found by determining exactly the frequency of the return signal or by watching its amplitude for comparison with the outgoing signal. In practice neither of these methods are practical because it is impossible to separate the return signal from the outgoing energy well enough to measure its frequency. Furthermore, the amplitude of the return signal can change at random during motion because of the changing aspect angle of the deflecting target or object whereby it is very well possible that the amplitude might diminish at any given instant while the object is approaching.

Heretofore, it has been common to employ a plurality of mutually independent instruments for supplying aspect information such as the craft's altitude above the terrain and rate of climb or descent of the craft. Also, other indications such as the approach of other aircraft or obstacles have required different, expensive and bulky electronic radar equipment, to the end that such equipment has not become generally used on aircraft because of the expense, space, and weights involved.

The principal object of the present invention is to provide a novel composite instrument which is of extremely simple construction and relatively light in weight and employing electronic components for accurately indicating not only the elevation of the craft above the ground particularly in the short ranges desired in making landings, but which also indicates accurately the rate of climb and rate of descent of the craft.

Another object of the present invention is to provide a novel instrument of the above character that is capable of detecting approaching objects such as another craft and indicating whether such craft is approaching or receding, the distance away and the relative radial speeds of such craft, said instrument being extremely valuable around airports to prevent collision of craft and to speed up landings and takeoffs.

Still another object of the present invention is to provide a novel instrument of the above character employing double, mutually phase shifted doppler signals for accurately indicating the radial velocity as well as relative direction of movement between two objects such as an aircraft and the ground or between two aircraft.

Another object of the present invention is to provide a novel instrument of the above character that is capable of determining an unknown frequency by reference to a known frequency, said instrument being able to readily indicate the sign of the difference frequency between the unknown frequency and the known frequency.

Other objects and advantages of this invention will become apparent from the specification, taken in connection with the accompanying drawings wherein the invention is embodied in concrete form.

Figure 2:
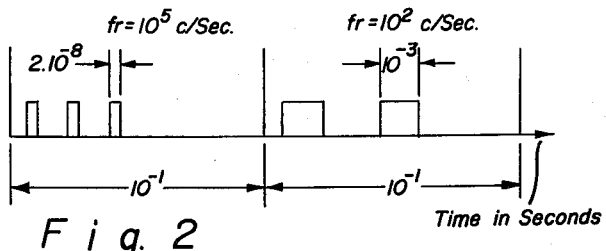
Figure 2A:
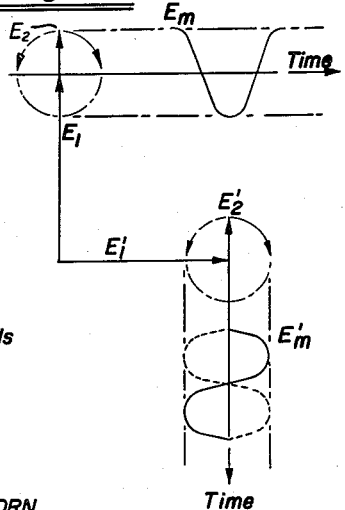
Figure 4:
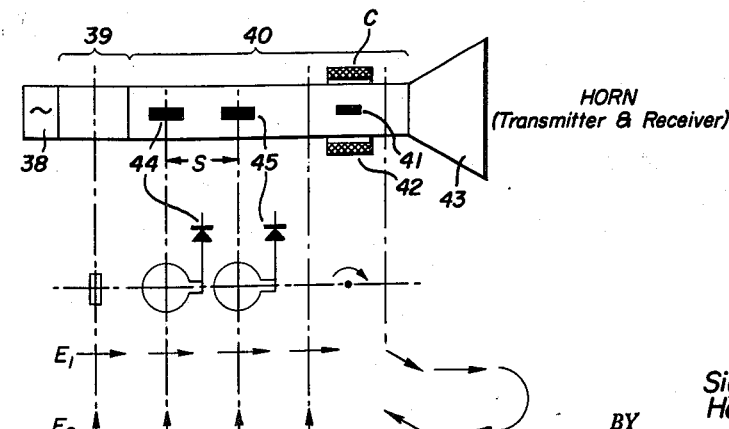
Figure 3:
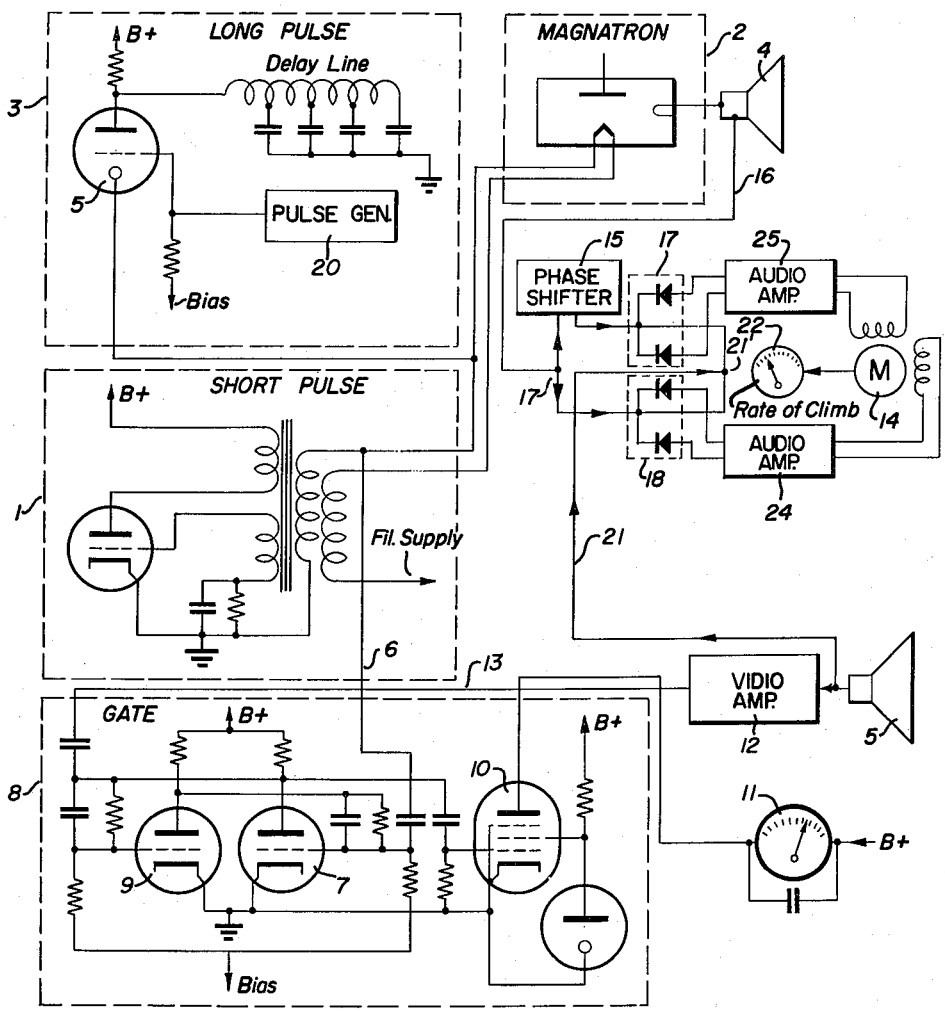
Figure 5:
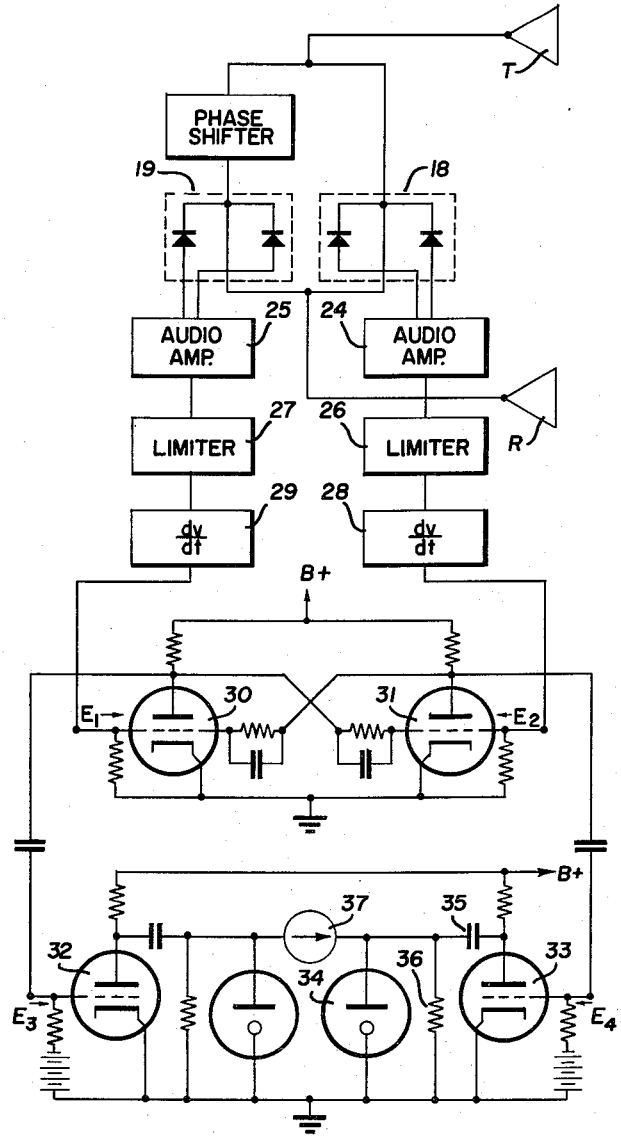
Figure 6:
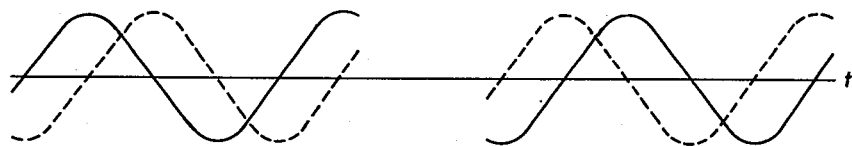
Figure 6:
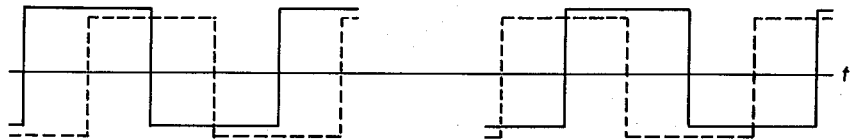
Figure 6:
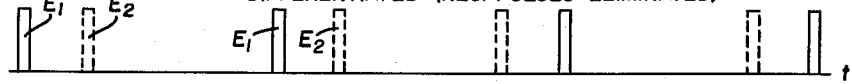
Figure 6:
Figure 6:
Figure 6:
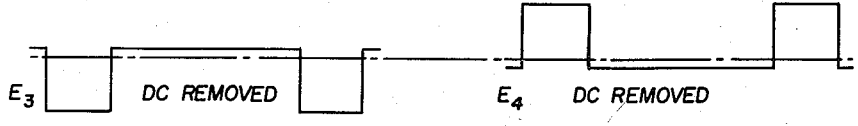
Figure 6:
Figure 6:
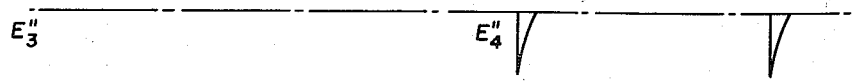

In the drawings,

FIG. 1 is a schematic block diagram illustrating the application of the instrument of this invention for giving the altitude of an aircraft with respect to the ground and for indicating the rate of climb or descent of aircraft, FIG. 2 is a schematic view illustrating different types of pulses emitted by the instrument of this invention, FIG. 2A is a vector diagram illustrating the operation of the instrument, FIG. 3 is a detailed circuit diagram of the circuit of FIG. 1, FIG. 4 shows a modified structure employing a gyrator for eliminating one antenna, FIG. 5 is a wiring diagram of an instrument similar to that disclosed in FIG. 1 but employs electronic phase comparison and counting means in lieu of a motor driven indicator giving rate of climb or the velocity of approaching objects, and FIG. 6 is a schematic view illustrating the operation of the apparatus of FIG. 5.

Referring now particularly to FIGS. 1 and 3 of the drawings, the reference numeral 1 designates a short pulse modulator or blocking oscillator which modulates a connected magnetron 2 at a suitable high or rapid rate for making distance measurements. Thus, if the desired overall range of distance measurement is on the order of one mile, the short pulse modulator 1 will trigger the generator or magnetron 2 operating at X-band, for example, on some 10,000 times per 1/10 sec., i.e., this short pulser will transmit to the magnetron some 10,000 pulses during 1/10 sec. thus providing a pulsewidth of $2 \times 10^{-8}$ sec. and a repetition frequency of $10^5$ c./sec., the output of the magnetron being fed to the transmitter antenna or horn 4 for radiation. During the next ⅒ sec. for making velocity measurements the long pulse modulator 3 will act to cause the magnetron to emit 10 pulses at a pulse-width of $10^{-3}$ sec. and a repetition frequency of $10^2$ c./sec. This is accomplished by the action of the pulse generator 20 (see FIG. 3) which puts out 100 pulses per sec. to trigger thyratron tube 5 of the long pulser 3 which causes the latter to modulate the connected magnetron generator 2 and produce a radio frequency pulse output of $10^{-3}$ c./sec. During this time the short pulser or blocking oscillator 1 is essentially loaded in such manner that it does not modulate the magnetron further so that the output of the magnetron consists of a series of 1 millisecond radio frequency velocity determining pulses interspersed with a pulse series of $2 \times 10^{-8}$ sec. pulses (see FIG. 2). The latter short pulses are utilized for distance measurement and the return signal is received by receiving antenna or horn 5 after reflection from a remote object, such as the ground where the instrument is used as a radio altimeter, or from another airplane or other object where the instrument is being used to measure the distance between objects.

Whenever the magnetron 2 is turned on to produce a short pulse by the short pulser or blocking oscillator 1, a negative pulse is sent over lead 6 (see FIG. 3) to multivibrator tube 7 of gate or gate circuit or current pulse generator 8 to bias this tube off and put tubes 9 and 10 on. With pentode tube 10 on, current starts to flow through the current averaging distance indicating meter such as altimeter 11. When the transmitted pulse is returned to the radar receiving antenna 5 and detected in a video amplifier 12, the amplified pulse is fed by lead 13 to the gate 8 to trigger the multivibrator tube 10 to its off position. In this way the current through the averaging meter 11 is proportional to range and hence indicates distance, or altitude when the instrument is used as an altimeter.

The long pulses triggered by pulser 3 are employed like a C.W. signal. The transmitted and received signals overlap within the pulse duration time of $10^{-3}$ sec., for example, and a doppler envelope obtained. Two signals at doppler frequency are produced. One is the standard doppler signal. For the second one, an additional phase shift of 90° is produced between the local signal and the return voltage. Thus, the lead 16 supplies a portion of the output signal through the magic T 17 to phase shifter 15 which produces a 90° phase shift between the local signal and return voltage. In this way a phase shift of 90° exists between the two doppler signals and it will be shown that, if this shift is positive, for example, for increasing distance it is negative for diminishing distance. Hence, a synchronous two phase motor 14 will turn clockwise for an approaching object and counterclockwise for a receding object. Thus, if an aircraft containing the equipment of this invention starts moving with respect to the ground, or a reflecting object T starts moving at time zero from location B with a velocity V which is supposed to be positive for increasing, and negative for decreasing, distance, and $E_1$ is the transmitted signal voltage and $E_2$ is the received voltage, then $$E_1 = E \sin \omega t$$

$$E_2 = KE \sin \omega \left(t - \frac{2D}{c}\right)$$

whereby K is an attenuation factor, c, velocity of light.

$$D = D' \pm vt$$

$$E_2 = KE \sin \omega \left(t - \frac{2D' \pm 2vt}{c}\right)$$

$$E_2 = KE \sin \left(\omega t - \frac{2D'\omega}{c} \mp 2\frac{V}{c}\omega t\right)$$

$$\frac{2D'\omega}{c} = \alpha \text{ represents a fixed phase angle.}$$

$2(v/c)\omega = \omega_d$ represents the angular doppler frequency. The signals $E_1$ and $E_2$ are fed into a balanced mixer 18 so that a third signal $E_m$ is produced with the amplitude of the received signal $E_2$ and with a phase-angle which is the difference between the angles of $E_1$ and $E_2$.

$$E_m = KE \cos (\alpha \pm \omega_d t)$$

A second balanced mixer 19 is arranged in such a way that an additional phase-shaft of $\pi/2$ is produced between $E_1$ and $E_2$.

$$E'_m = KE \cos \left(\alpha + \frac{\pi}{2} \pm \omega_d t\right)$$

Neglecting the constant phase-angle $\alpha$, we have the following conditions. For increasing distance:

$$E_m = KE \cos (\omega_d t)$$

$$E'_m = KE \cos \left(\omega_d t + \frac{\pi}{2}\right)$$

For decreasing distance:

$$E_m = KE \cos (\omega_d t)$$

$$E'_m = KE \cos \left(\omega_d t - \frac{\pi}{2}\right)$$

A rotating magnetic or electrostatic field can, therefore, be produced whose direction of rotation depends on the direction of the radial relative motion of the object.

Thus the magnetron tube acts as a C.W. transmitter, the energy being radiated by transmitter or horn 4, reflected from a relatively moving object or target, and received by horn or receiver antenna 5. A small part of the transmitted signal is branched off through lead 16 to the two balanced mixers 18 and 19, the delay line 15 producing a phase shift of 90° between the two local signals. The return signal fed over lead 21 is split symmetrically at magic-T 21' and fed to the detectors of the balanced mixers 18 and 19 and these mixers produce, according to the theory described, the two doppler signals $E_m$ and $E'_m$ which are amplified in amplifiers 24 and 25 and passed to quadrature windings of motor 14 for driving the indicator 22 in the proper direction and at the proper speed to indicate the direction and relative velocity involved.

Instead of using mathematics, the operation of the device can also be explained by the use of rotating vectors as shown in FIG. 2A. $E_1$ and $E'_1$ represent the two local signals, $\pi/2$ radians out of phase. $E_2$ and $E'_2$ are the return signals. They rotate with the angular doppler frequency and the mixer output is represented by their projection on the local vectors $E_1$.

Increasing distance corresponds to clockwise rotation and diminishing distance to counterclockwise rotation. Hence, the mixer output voltage $E_m$ is the same for both directions. $E'_m$, however, is $\pi/2$ radians advanced or delayed with respect to $E_m$, depending on the sense of rotation of $E'_2$. Thus the rate instrument 22 driven from motor 14 gives directly the rate of change of distance, i.e., velocity between the equipment of this invention and the other relatively movable object such as the ground and without ambiguity as to the relative direction of motion involved.

Should the doppler frequency be so high that motor 14 does not fully respond due to mechanical inertia, an electronic phase comparison and counting apparatus can be substituted in lieu thereof. Such an arrangement is shown in FIG. 5 wherein the amplified doppler signals leaving amplifiers 24 and 25 are limited in limiters 26 and 27 and differentiated in differentiators 28 and 29. FIG. 6 shows the relatively phase shifted doppler waves from the amplifiers, the limited waves, and the differentiated waves having the form of pulses $E_1$, $E_2$. These pulses are fed into a fast acting flip-flop circuit where one signal, i.e., the solid pulse $E_1$ turns the tube 30 of the flip-flop circuit on and tube 31 of this circuit off. The other signal, i.e., broken line pulse $E_2$ turns tube 31 on and tube 30 off. At the plate of tube 30 a series of short negative pulses ($E_3$ of FIG. 6) are obtained for an ascending craft as where the device is being used as an altimeter and a series of long negative pulses ($E_3'$) when the craft is descending. At the plate of tube 31 the polarity of the pulses is reversed as shown at $E_4$ and $E_4'$ in FIG. 6.

Tube 30 is coupled to the gate tube 32 and tube 31 is coupled to gate tube 33. The gate tubes are biased so that only short positive pulses have an effect on the plate current and hence for the ascending condition tube 32 is not controlled. Tube 33, however, will produce short negative pulses. These pulses are fed into a simple cycle counting circuit consisting of a diode 34 and a condenser 35 and resistor 36. Meter 37 is a zero center meter and therefore will deflect up or down depending on the direction of the motion. The magnitude of the deflection is proportional to the number of pulses, i.e., to the absolute doppler frequency which in turn is proportional to the velocity of the craft in the case of altimeters or the relative velocity of the craft and another object as where the other object is another craft. For the descending condition tube 33 is not controlled but tube 32 will produce short negative pulses to effect movement of the meter 37 downwardly from the zero position. The speed of response of this apparatus of FIG. 5 is greatly increased over that of the motor 14 of FIG. 3 and replaces the same where high doppler frequencies, i.e., extremely high relative velocities, are involved.

In the forms of the apparatus hereinbefore described both transmitting and receiving antennae are employed. In some instances it may be desirable to employ but a single antenna and a low loss duplexing arrangement with a single antenna can be built employing a gyrator as shown in FIG. 4. In this figure a klystron 38 produces a horizontally polarized wave $E_1$ which passes along the rectangular waveguide section 39 with the standard $TE_{01}$ mode. From the rectangular waveguide section 39 the wave traverses a round guide 40 with the $TE_{11}$ mode. A gyrator 41 consisting of a ferrite rod surrounded by the coil 42 turns the polarization plane clockwise by 45° so that the energy as radiated by horn 43 is shifted by a 45° angle with respect to the wave in section 39. Two detectors 44 and 45 are arranged in such a way that they receive only a very small part of $E_1$ which serves as a local signal.

The signal is reflected by the target or ground, as the case may be, and enters the horn 43 with its plane of polarization shifted by $-135°$ with respect to the original signal in section 39. This is represented by vector $E_2$. After passing through the gyrator the returning wave is again turned 45° so that the plane of polarization is now vertical as shown by the arrows in FIG. 4. The two detectors receive freely the reflected signal and the two doppler signals are produced. The detectors are spaced by the distance $S=(2n+1)\lambda/8$, so that, if the phase-shift between local and return signals is $\phi$ in detector 44 it is $\phi+\pi/2$ in detector 45. It has been shown earlier that this is the condition for the production of a rotating field by the two doppler signals, and the signals from these two detectors can be amplified and used to operate a motor or other apparatus for indicating relative velocity and direction of motion.

If the frequency of a wave has to be determined, it is normal to compare the unknown frequency with a known one by beat methods. In this way, the difference frequency can be measured, but it is not easy to determine whether this difference frequency is positive or negative. By the use of phase shifter 15 and mixers 18 and 19, arranged in such a way that the two beat-notes are 90° out-of-phase, it becomes readily possible to determine the sign of the difference frequency. Again, the two-phase motor 14 can be employed or an electronic equivalent thereof to operate an indicator 22 to show the difference frequency.

Since many changes could be made in the above construction of the novel composite instrument of this invention and many apparently widely different embodiments of this invention could be made without departing from the scope thereof, such as the adaptation thereof for the tracking of projectiles and aircraft for determining their speed and/or distance, it is intended that all matter contained in the above description or shown in the accompanying drawings shall be interpreted as illustrative and not in a limiting sense.

What is claimed is:

1. A composite instrument comprising a generator, modulating means for modulating said generator alternately at higher and lower frequencies, radiator means fed from said generator for discharging said generator output into space for reflection from an object, a gate circuit connected to said modulating means for receiving a portion of the higher frequency output thereof, a distance measuring meter connected to said gate circuit to be initiated in its operation upon the receipt by said gate circuit of said higher frequency energy, receiver means for receiving energy reflected from the object and for applying a version thereof to said gate circuit for stopping the operation of said distance measuring meter, whereby the distance to the object is indicated, balanced mixers connected to be fed with energy from said generator and with a portion of the energy reflected from the object, means for shifting the phase of the generator energy supplied to one of said mixers, thereby producing phase shifted doppler signals, and a velocity indicator controlled from said doppler signals.

2. A composite instrument comprising a generator, means for recurrently modulating said generator to produce trains of long and short pulses, a radiator, means supplying the modulated output of said generator to said radiator for radiation therefrom for reflection from a remote object, a gate circuit connected to be fed with short pulses from said modulating means, an averaging meter controlled from said gate circuit to be initiated in its operation upon the application of a modulating signal to said gate circuit, means for detecting and amplifying the reflected wave from the remote object, means for applying said detected wave to said gate circuit for causing the cutting off of current to said averaging meter whereby the distance of the remote object is indicated, balanced mixtures fed with energy from said generator and with a portion of the energy of said reflected wave, means for shifting the phase of the generated energy supplied to one of said balanced mixers to produce a phase shift of 90° between the local signals thereby forming with said reflected wave a pair of doppler signals having a 90° phase shift therebetween, and a velocity indicator controlled from said doppler signals for indicating the direction of movement and speed of the aircraft with respect to said object.

3. A composite instrument comprising a generator, a space radiator supplied from said generator, modulating means for modulating the output of said generator for consecutively producing series of short and long pulses for emission from said radiator means, space receiver means for receiving energy reflected from a remote object, a gate circuit controlled from said modulating means and from said space receiver means and responsive to short pulses of the former to initiate distance measurements and to reflected energy from the latter for completing distance measurements, and balanced mixer means fed from said generator and from said space receiver means for producing velocity measuring doppler signals, and phase shifting means interposed between said generator and a portion of said balanced mixer means whereby a phase shift exists between the doppler outputs of said balanced mixer means so that such outputs are capable of use in indicating speed and also direction of movement of remote objects.

4. A composite instrument as defined in claim 3 wherein said balanced mixer means comprises a pair of balanced mixer similarly fed from said generator means and from said space receiver means, said phase shifter means comprising a 90° phase shifter interposed between said generator means and one of said balanced mixers, means for amplifying the outputs of said balanced mixers, a velocity indicator and a quadrature motor for driving said indicator and having quadrature windings energized respectively by the amplified outputs of said balanced mixers.

5. A composite instrument as defined in claim 3 wherein said balanced mixer means comprises a pair of balanced mixers similarly fed from said generator means and from said space receiver means, said phase shifter means comprising a 90° phase shifter interposed between said generator means and one of said balanced mixers, means for amplifying the outputs of said balanced mixers, means for limiting said amplified outputs, means for differentiating said limited outputs, a flip-flop circuit controlled from said limited outputs, a velocity indicating instrument and a gate circuit controlled from said flip-flop circuit and connected to operate said velocity indicator whereby the latter shows both the speed and relative direction of movement of the remote object.

6. In a composite instrument of the character described, means for producing a polarized wave, waveguide means for conveying said wave, gyrator means cooperating with said waveguide means for rotating the polarization of said wave, means for radiating said rotated wave for reflection from a remote object, detector means in said waveguide, said radiating means serving to receive a reflected wave from the object for passage through said gyrator means to be further rotated and passed to said detector means, said detector means producing phase shifted dopplers for use by indicator means determining the relative speed and direction of movement of the object.

7. In a composite instrument of the character described, a generator, modulating means for modulating said generator, radiator means fed from said generator for discharging said generator output into space for reflection from another object, receiver means for receiving energy reflected from the other object, balanced mixers connected to be fed with energy from said generator and to said receiver means to receive energy reflected from the other object, means for shifting the phase of the generator energy supplied to one of said mixers, thereby producing phase shifted doppler signals, and a velocity indicator controlled from said doppler signals.

8. A composite instrument comprising a generator, translating means supplied from said generator, modulating means for modulating the output of said generator for producing a series of long pulses for emission from said translating means, said translating means serving to receive energy reflected from a remote object, balanced mixer means fed from said generator and from said translating means for producing velocity measuring doppler signals, and phase shifting means interposed between said generator and a portion of said balanced mixer means whereby a phase shift exists between the doppler outputs of said balanced mixer means so that such outputs are capable of use in indicating speed and also direction of movement of remote objects.

9. A composite instrument as defined in claim 8 wherein said balanced mixer means comprises a pair of balanced mixers similarly fed from said generator means and from said translating means, said phase shifter means comprising a 90° phase shifter interposed between said generator means and one of said balanced mixers, means for amplifying the outputs of said balanced mixers, a velocity indicator and a quadrature motor for driving said indicator and having quadrature windings energized respectively by the amplified outputs of said balanced mixers.

10. A composite instrument as defined in claim 8 wherein said balanced mixer means comprises a pair of balanced mixers similarly fed from said generator means and from said translating means, said phase shifter means comprising a 90° phase shifter interposed between said generator means and one of said balanced mixers, means for amplifying the outputs of said balanced mixers, means for limiting said amplified outputs, means for differentiating said limited outputs, a flip-flop circuit controlled from said limited outputs, a velocity indicating instrument and a gate circuit controlled from said flip-flop circuit and connected to operate said velocity indicator whereby the latter shows both the speed and relative direction of movement of a remote object.

11. In an instrument of the character described, means for producing a polarized wave, waveguide means for conveying said wave, means fed from said waveguide means for radiating said wave for reflection from a remote object, detector means in said waveguide means for detecting two doppler signals, said radiating means serving to receive a reflected wave from the object for passage to said detector means, means for shifting the phase of one of the doppler signals with respect to the other by a predetermined relatively fixed phase angle before detection thereby producing phase shifted dopplers for use in determining the relative speed and direction of movement of the object.

12. In an instrument of the character described, a generator, radiator means fed from said generator for discharging said generator output into space for reflection from an object, receiver means for receiving energy reflected from the object, mixer means connected to be fed with energy from said generator and with object reflected energy from said receiver means, means for shifting the phase of the generator energy supplied to said mixer means, thereby producing phase shifted doppler signals, a low inertia velocity indicator controlled from said doppler signals, said low inertia velocity indicator comprising an electronic phase comparator for using said doppler signals, and electronic counting apparatus controlled thereby.

References Cited in the file of this patent

UNITED STATES PATENTS

| | | |
|---|---|---|
| 2,412,111 | Wilson | Dec. 3, 1946 |
| 2,525,089 | Blumlein | Oct. 10, 1950 |
| 2,540,076 | Dicke | Feb. 6, 1951 |
| 2,558,758 | Jaynes | July 3, 1951 |